(12) United States Patent
Cronin

(10) Patent No.: US 10,010,204 B2
(45) Date of Patent: Jul. 3, 2018

(54) COMBINATION COASTER AND ELECTRONIC DEVICE HOLDER

(71) Applicant: James Barry Cronin, San Diego, CA (US)

(72) Inventor: James Barry Cronin, San Diego, CA (US)

(73) Assignee: James B Cronin, San Diego, CA (US)

( * ) Notice: Subject to any disclaimer, the term of this patent is extended or adjusted under 35 U.S.C. 154(b) by 0 days.

(21) Appl. No.: 15/268,261

(22) Filed: Sep. 16, 2016

(65) Prior Publication Data

US 2018/0078068 A1    Mar. 22, 2018

(51) Int. Cl.
| | | |
|---|---|---|
| *A47B 91/00* | (2006.01) |
| *A47G 23/032* | (2006.01) |
| *H04M 1/11* | (2006.01) |
| *A47B 23/04* | (2006.01) |
| *B65D 5/52* | (2006.01) |

(52) U.S. Cl.
CPC .......... *A47G 23/032* (2013.01); *A47B 23/042* (2013.01); *B65D 5/5206* (2013.01); *H04M 1/11* (2013.01)

(58) Field of Classification Search
CPC ..... A47G 23/032; H04M 1/11; A47B 23/042; B65D 5/5206

USPC ......... 248/346.03, 346.01, 346.11, 459, 460, 248/461; 455/575.1; 206/193, 194, 170, 206/174, 175
See application file for complete search history.

(56) References Cited

U.S. PATENT DOCUMENTS

| | | | | |
|---|---|---|---|---|
| 2,726,835 | A * | 12/1955 | Hummel | A47F 5/112 211/73 |
| 6,371,428 | B1 * | 4/2002 | Zorich | A47C 7/70 206/549 |
| 7,861,995 | B2 * | 1/2011 | Liou | F16M 11/105 248/454 |
| 8,091,702 | B1 * | 1/2012 | Keip | A47G 23/0208 206/171 |
| D714,806 | S * | 10/2014 | Fujioka | D14/447 |
| 8,950,720 | B1 * | 2/2015 | Carr | A47B 23/044 248/454 |
| 9,326,628 | B2 * | 5/2016 | Kelsey | A47G 23/032 |

* cited by examiner

*Primary Examiner* — Todd M Epps
(74) *Attorney, Agent, or Firm* — Plager Schack LLP

(57) ABSTRACT

Some embodiments of the present disclosure include a device for simultaneously holding a personal item and a beverage container. The device may include a coaster portion configured to accommodate the beverage container; and a personal item holder portion attached to the coaster portion, the personal item holder portion configured to accommodate the personal item. The coaster portion and the attached personal item holder portion may be made from a flat blank having a tab at a first end and a slot positioned closer to a second end. The personal item holder portion may be formed by folding up a portion of the flat blank such that the tab is inserted into the slot.

7 Claims, 2 Drawing Sheets

COMBINATION COASTER AND ELECTRONIC DEVICE HOLDER

BACKGROUND

The embodiments herein relate generally to barware, and more particularly, to a combination coaster and electronic device holder.

When enjoying a beverage at, for example, a restaurant or bar, there is often not a convenient and dry place to place a personal electronic device, such as a cell phone. People also tend to place their phones on the bar top or table and then leave it behind when they leave.

Therefore, what is needed is a device that can be simultaneously used to hold a personal item and as a coaster for a beverage.

SUMMARY

Some embodiments of the present disclosure include a device for simultaneously holding a personal item and a beverage container. The device may include a coaster portion configured to accommodate the beverage container; and a personal item holder portion attached to the coaster portion, the personal item holder portion configured to accommodate the personal item. The coaster portion and the attached personal item holder portion may be made from a flat blank having a tab at a first end and a slot positioned closer to a second end. The personal item holder portion may be formed by folding up a portion of the flat blank such that the tab is inserted into the slot.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to hold an electronic device, such as a cell phone, while simultaneously being used as a coaster and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Coaster Portion
2. Personal Item Holder Portion

The various elements of the device of the present disclosure may be related in the following exemplary fashion. It is not intended to limit the scope or nature of the relationships between the various elements and the following examples are presented as illustrative examples only.

Figure 1:
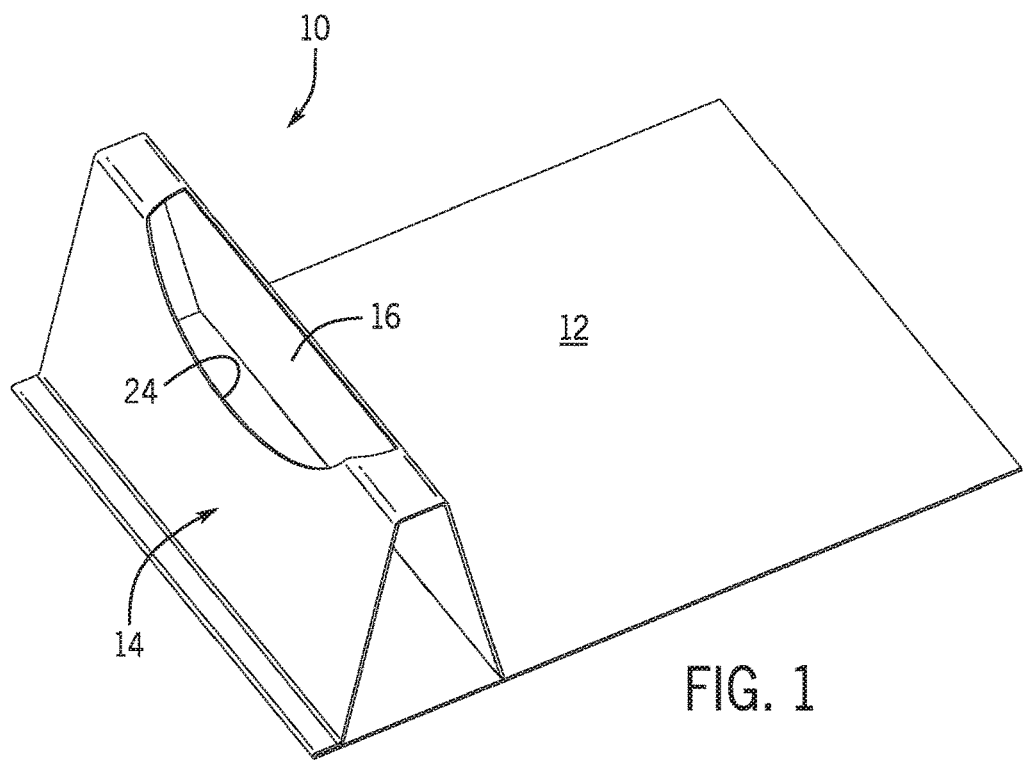
FIG. 1 is a front perspective view of one embodiment of the present disclosure.
Figure 2:
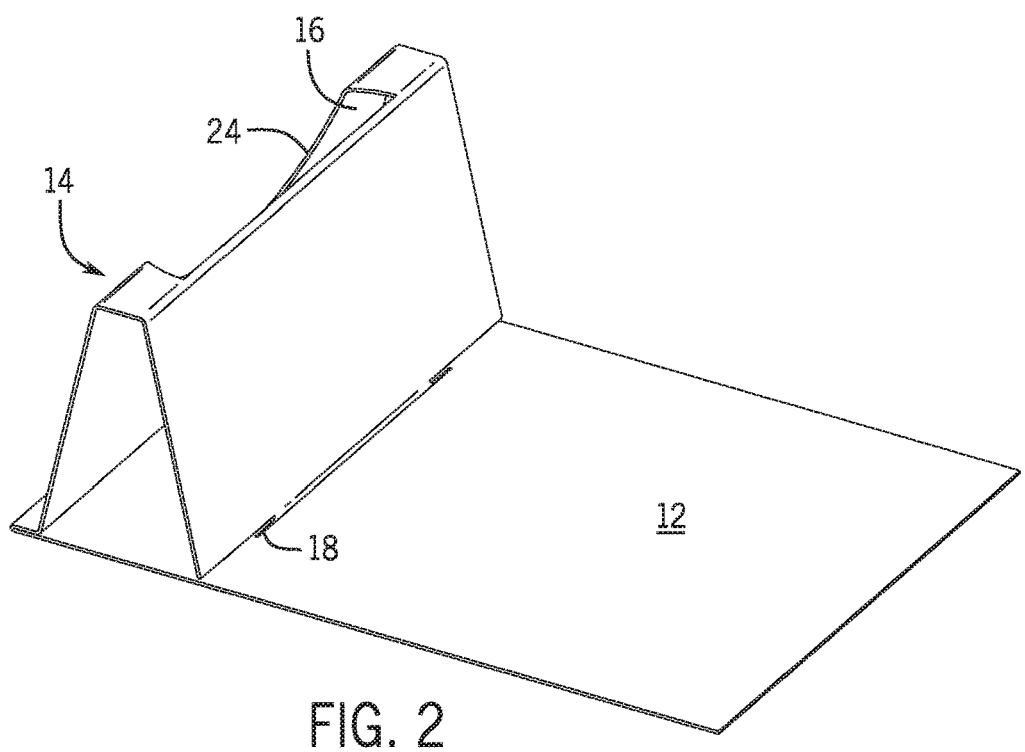
FIG. 2 is a rear perspective view on one embodiment of the present disclosure.

By way of example, and referring to FIGS. 1-4, some embodiments of the present disclosure include a device 10 for simultaneously holding a personal item, such as a cell phone 20, and a beverage container 21, the device 10 comprising a coaster portion 12 with an attached personal item holder portion 14, wherein the coaster portion 12 and the attached personal item holder portion 14 comprise a flat blank 22 having a tab 26 at a first end and a slot 18 positioned closer to a second end, and the personal item holder portion 14 is formed by folding up a portion of the flat blank 22 such that the tab 26 is inserted into the slot 18. The slot 18 may be positioned far enough away from the second end 18 to provide enough space of the flat blank 18 to function as the coaster portion 12. The flat blank 22 may further comprise an opening, such as a die cut opening 24 positioned between the tab 26 and the slot 18, such that when the tab 26 is inserted into the slot 18, the die cut opening 24 is substantially parallel to the coaster portion 12. In embodiments, the die cut opening 24 may be sized to accommodate a cell phone 20, as shown in FIG. 1.

Figure 3:
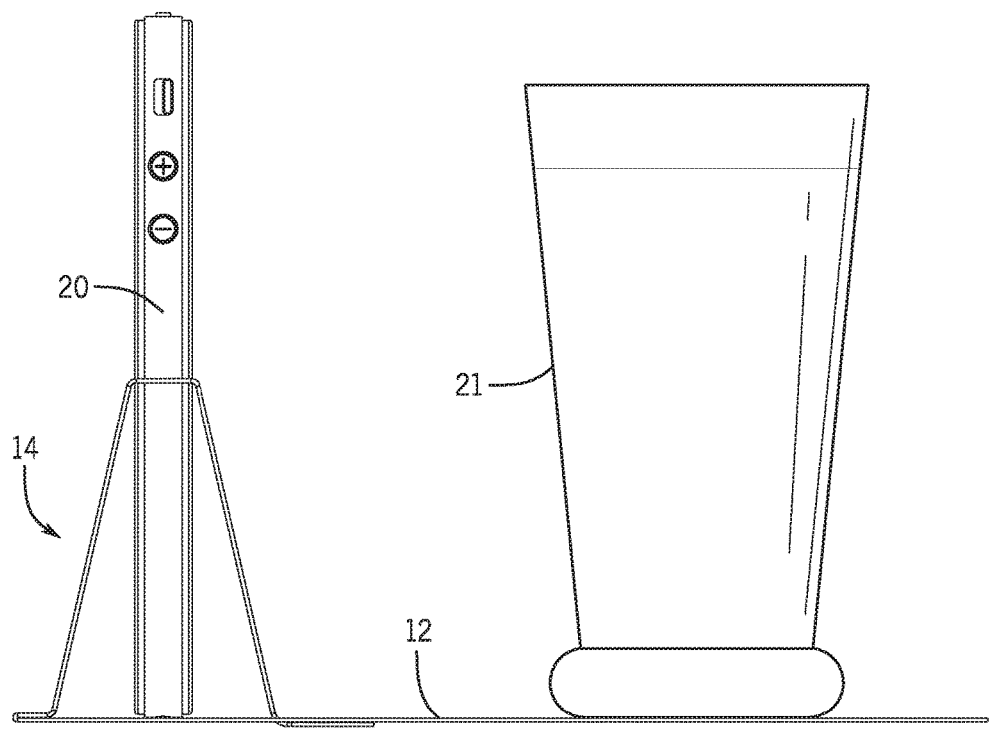
FIG. 3 is a side elevation view of one embodiment of the present disclosure.
Figure 4:
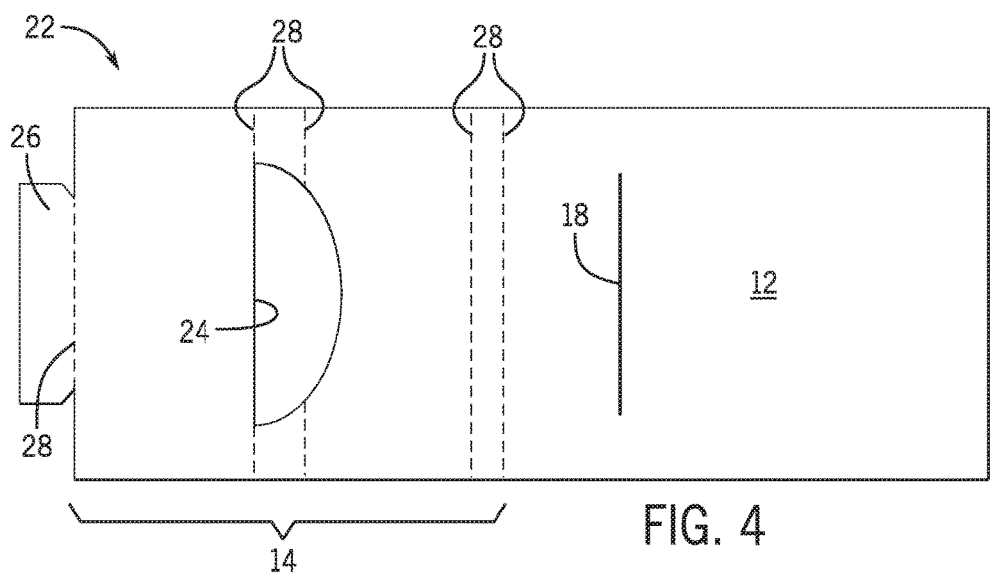
FIG. 4 is a top plan view of one embodiment of the present disclosure.

As shown in the Figures, the flat blank 22 may comprise a plurality of scored fold lines 28 to assist a user in forming the personal item holder portion 14. For example, at the junction of the tab 26 and the personal item holder portion 14 may be a scored fold line 28, such that when the tab 26 is inserted into the slot 18, the tab 26 folds substantially parallel to a bottom surface of the flat blank 22, as shown in FIG. 3. Scored fold lines 28 may also be positioned proximate to the die cut opening 24 and the slot 18, such that when the personal item holder portion 14 is folded, it has a substantially triangular cross-section, as shown in FIG. 3, and, thus, is configured to function as a holder or stand for an item, such as a cell phone 20.

As a result of the structure of the device 10 of the present disclosure, the device 10 may be used simultaneously as a coaster and as a cell phone holder. Thus, the device 10 may simultaneously reduce the likelihood of a user placing his or her phone 20 on a wet bar surface and provide a place for a beverage container 21 to be placed to prevent getting the bar surface wet.

The device 10 of the present disclosure may be made from any suitable materials and, in some embodiments, comprises cardstock. The device 10 of the present disclosure may also have any desired shape or size. In some embodiments, the flat blank 22 may be approximately 10 inches long by about 5 inches wide and, thus, may have a rectangular shape. However, other embodiments may have any shape and size desired by the user. For example, the flat blank 22 may have a shape such that the coaster portion 12 comprises a star, flower, heart, circle, triangle, or any other desired shape.

To use the device 10 of the present disclosure, a user simply folds the personal item holder portion 14 along the scored fold lines 28 and inserts the tab 26 into the slot 18.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for simultaneously holding a personal item and a beverage container, the device comprising:
   a coaster portion configured to accommodate the beverage container; and
   a personal item holder portion attached to the coaster portion, the personal item holder portion configured to accommodate the personal item,
   wherein:
      the coaster portion and the attached personal item holder portion comprise a flat blank having a tab at a first end and a slot positioned closer to a second end;
      the slot is positioned at a location on the flat blank such that the tab engages with the slot; and
      the flat blank comprises an opening positioned between the tab and the slot, such that when the tab is inserted into the slot, the opening is substantially parallel to and not planar with the coaster portion.

2. The device of claim 1, wherein the opening is sized to accommodate a cell phone.

3. The device of claim 1, wherein the flat blank further comprises a plurality of scored fold lines.

4. The device of claim 1, wherein, when folded up, the personal item holder portion has a substantially triangular cross section.

5. The device of claim 1, wherein the flat blank comprises card stock.

6. The device of claim 1, wherein the flat blank is about 10 inches long and about 5 inches wide.

7. The device of claim 1, wherein the opening is semi-circular in shape.

* * * * *